(12) United States Patent
Bearden et al.

(10) Patent No.: US 7,669,034 B2
(45) Date of Patent: Feb. 23, 2010

(54) SYSTEM AND METHOD FOR MEMORY ARRAY ACCESS WITH FAST ADDRESS DECODER

(75) Inventors: David R. Bearden, Austin, TX (US);
George P. Hockstra, Austin, TX (US);
Ravindraraj Ramaraju, Round Rock, TX (US)

(73) Assignee: Freescale Semiconductor, Inc., Austin, TX (US)

(*) Notice: Subject to any disclaimer, the term of this patent is extended or adjusted under 35 U.S.C. 154(b) by 221 days.

(21) Appl. No.: 11/257,932

(22) Filed: Oct. 25, 2005

(65) Prior Publication Data

US 2007/0094479 A1 Apr. 26, 2007

(51) Int. Cl.
*G06F 12/00* (2006.01)
(52) U.S. Cl. ..................................... 711/220
(58) Field of Classification Search ................. 711/220
See application file for complete search history.

(56) References Cited

U.S. PATENT DOCUMENTS

| | | | |
|---|---|---|---|
| 3,265,876 A | 8/1966 | Lethin | |
| 5,754,819 A | 5/1998 | Lynch et al. | |
| 6,813,628 B2 | 11/2004 | Bhushan et al. | |
| 2003/0110198 A1 | 6/2003 | Park | |
| 2004/0064674 A1* | 4/2004 | Asano et al. | 711/220 |

OTHER PUBLICATIONS

J. Cortadella et al., "Evaluation of A+B=K Conditions Without Carry Propagation," IEEE *Trans. on Computers*, vol. 41, No. 11, Nov. 1992.
J. Cortadella et al., "Evaluation of A+B=K Conditions in Constant Time," *IEEE ISCAS*, 1988.
Y. Lee et al., "Address Addition and Decoding without Carry Propagation," IEICE Trans. Inf. & Syst., vol. E80-D, No. 1, Jan. 1997.
R. Heald et al., "64-kbyte Sum-Addressed-Memory Cache with 1.6ns Cycle and 2.6ns Latency," IEEE JSSC, vol. 33, No. 11, Nov. 1998.
W. Lynch et al., "Low Load Latency through Sum-Addressed Memory (SAM)".
International Search Report and Written Opinion for correlating PCT Patent Application No. PCT/US06/40017, Applicant's file reference SC13805TC, dated May 19, 2008.
U.S. Appl. No. 11/552,817; Non-final Office Action dated Aug. 20, 2009.

* cited by examiner

*Primary Examiner*—Matt Kim
*Assistant Examiner*—Ryan Dare
(74) *Attorney, Agent, or Firm*—VanLeeuwen & VanLeeuwen; David G. Dolezal

(57) ABSTRACT

A method and data processing system for accessing an entry in a memory array is provided using base and offset addresses without adding the base and offset addresses. PGZO encoding is performed on the address bits of the operands. The PGZO values are evaluated using wordline generators resulting in a plurality of possible memory array entry addresses. In parallel with the PGZO operations, a carry value is generated using other bits in the operands. The result of the carry operation determines which of the possible memory array entries is selected from the memory array.

16 Claims, 14 Drawing Sheets

SYSTEM AND METHOD FOR MEMORY ARRAY ACCESS WITH FAST ADDRESS DECODER

FIELD OF THE INVENTION

The present invention relates generally to the area of accessing memory. More particularly, the present invention relates to quickly selecting a word line from a memory array given a base and offset.

RELATED ART

Memory addressing in traditional processors is typically computed by adding a base address to an offset address in order to arrive at an effective address. Base+offset addressing is typically used to address memory within data caches as well as data or instructions within other CPU memory units. For example, Table-Lookaside-Buffers (TLBS) typically use base+offset addition in order to access a buffer location within the TLB.

Because an addition is typically performed to arrive at the effective address, traditional processors usually take at least two cycles to access the memory. A first cycle is used to add the base and offset addresses and a second cycle is used to access the memory. Consequently, because two cycles are usually needed to access the memory in a traditional processor, the cycle immediately following a load instruction cannot use the result of the load operation. This delay is referred to as "load latency." Load latency is a performance limitation factor in traditional processors. Load latency often manifests itself in a pipelined processor as a load-use penalty with the load results being unavailable for two machine cycles.

Therefore, what is needed is a system and method that minimizes the number of logic needed to access a memory array based on (base+offset) addressing.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
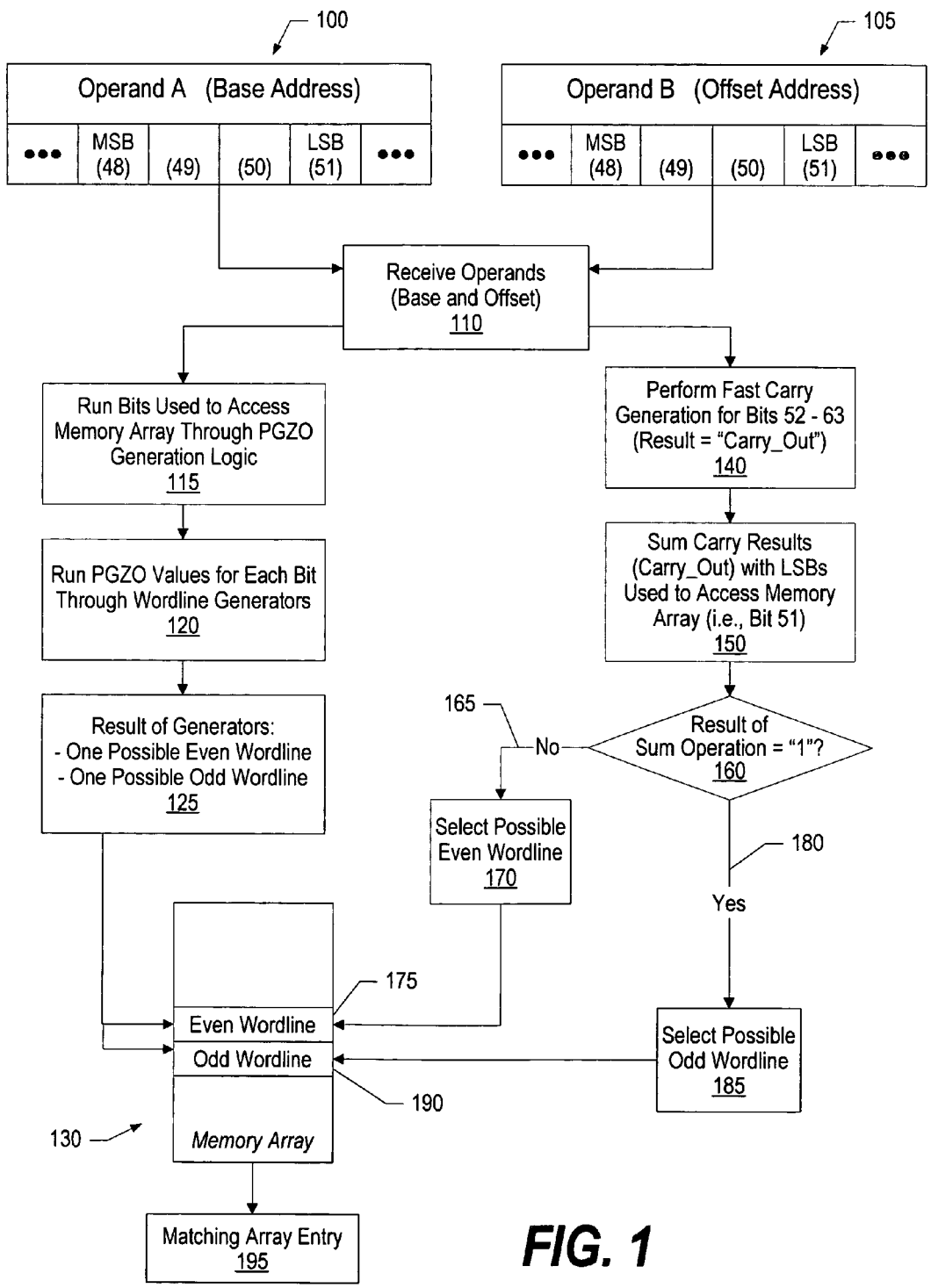
FIG. 1 is a high level flowchart showing the steps used in combining a base and offset to compute a word line from a memory array.

FIG. 1 is a high level flowchart showing the steps used in combining a base and offset to compute a word line from a memory array. Operand A (100) and operand B (105) each include a number of bits. In one embodiment, each operand includes 64 bits numbered 0 to 63. Some of the bits in the operand are used to address a memory entry in a memory array.

In the example shown, four bits in the operands (bits 48 through 51) are used to address the memory entry. In the embodiment shown, one of the operands (Operand A) provides the "base" address and the other operand (Operand B) provides the "offset" address that are used to generate the "effective" address of the memory entry. In the embodiment shown, bit 48 is the most-significant-bit (MSB) and bit 51 is the least-significant bit (LSB). In other embodiments, the significance of the bits might be reversed so that the higher-numbered bit is more significant than the lower-numbered bit.

At step 110, the base and offset addresses (operands) are received. Two parallel processes commence at this point. One process evaluates the address bits (e.g., bits 48 through 51) to arrive at two possible wordlines (as used herein, a "wordline" is an address of an entry in the memory array or an actual memory array entry, as the context indicates). The other process determines if a carry results from bits in the operands (e.g., bits 52 through 63) and adds the carry value to the LSBs of the bits of the Operand A and B used to address the memory entry. The summation value determines which of the possible wordlines is the actual wordline.

The first parallel process commences at step 115 which runs the bits that are used to access the memory array (e.g., bits 48 through 51 for both Operands A and B) through PGZO generation logic. PGZO generation logic combines pairs of bits using logical operators (XOR, OR, AND, NAND) to create PGZO values. PGZO values are generated for the MSBs (bit 48 from both operands), bit 49 from both operands, bit 50 from both operands and from the LSBs (bit 51 from both operands). In the example shown, four bits are provided from the base and offset to generate a four bit effective address. Therefore, in the example shown, the effective address can be used to access a memory entry from a sixteen entry memory array. In step 120, the PGZO values for the various pairs of bits are run through wordline generators (see FIGS. 7 and 8 for an embodiment of wordline generators). Multiple copies of the wordline generators are used depending on the size of the memory array being accessed. In the sixteen-entry memory array shown in the example, sixteen copies of the wordline generators are used (eight copies of the generator depicted in FIG. 7 and eight copies of the generator depicted in FIG. 8). Each of the generators takes the PGZO values as inputs and results whether a particular address in the memory array is a possibility. At step 125, the results of the wordline generators is received. In the embodiment shown, the results of running the PGZO values through the wordline generators is one possible even wordline (with 0 being considered an even wordline, i.e., 0, 2, 4, 6, 8, 10, 12, and 14) and one possible odd wordline (i.e., 1, 3, 5, 7, 9, 11, 13, 15). In the example shown, even wordline 175 and odd wordline 190 have been identified as the possible wordlines within memory array 130.

In the embodiment shown, the reason that there are two wordline possibilities is because there may be a carry resulting from the bits that are less significant than the LSB used in the address. In the embodiment shown, the bits that are less significant are bits 52 through 63 for both operands A and B. The second parallel process is used to determine whether the odd or even wordline is the correct wordline from memory array 130. Steps 140 and 150 take place in parallel with steps 115 and 120. In step 140, a fast carry generation is performed for bits 52 through 63 for both operands A and B. In step 150, the carry out value generated in step 140 is summed (added) to the least-significant-bits (LSBs) of the Operands A and B. A determination is made as to whether the sum operation results in a "1" or a "0" (decision 160). If the sum operation results in a "0," decision 160 branches to "no" branch 165 whereupon, at step 170, even possible wordline 175 is selected. On the other hand, if the sum operation results in a "1," then decision 160 branches to "yes" branch 180 whereupon, at step 185, odd possible wordline 190 is selected. At step 195, the selected wordline is retrieved from memory array 130.

Figure 2:
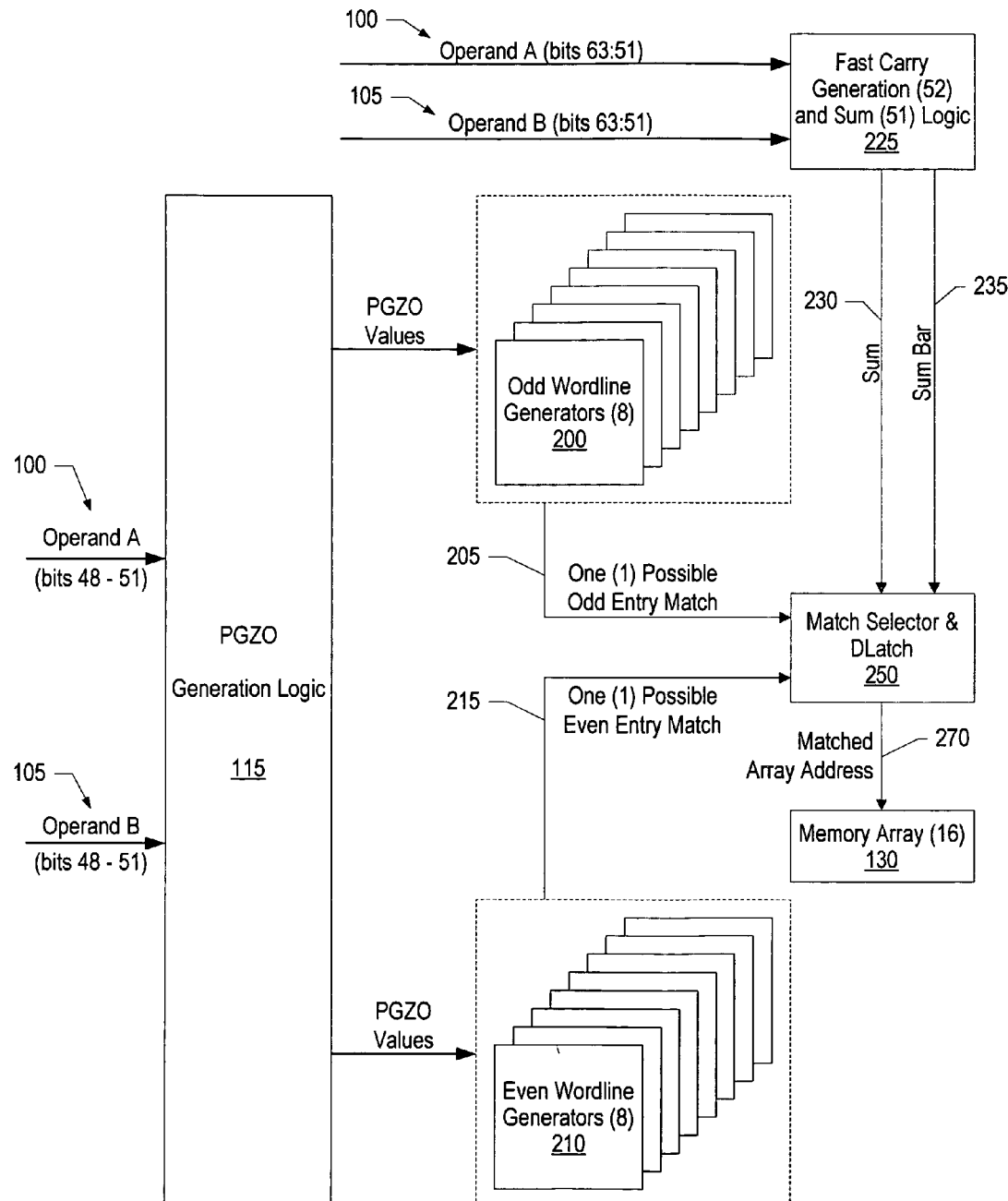
FIG. 2 is a diagram showing various components used in computing the word line from the base and offset.

FIG. 2 is a diagram showing various components used in computing the word line from the base and offset operands. Bits 48-51 (the memory array address bits) are provided to PGZO generation logic 115 for both Operand A (100) and Operand B (105). The resulting PGZO values are provided to copies of wordline generators. Eight odd wordline generators (200) are used to process PGZO values resulting in one possible odd memory array address (205). In addition, eight even wordline generators (210) are used to process PGZO values resulting in one possible even memory array address (215).

In parallel with PGZO generation logic 115 and wordline generators 200 and 210, fast carry generation logic is performed on bits 52 through 63 and the carry value is added to the LSB of the memory address bits of the Operands A and B. This results in sum value 230 which is either '0' or '1,' and sum bar 235 which is the opposite of the sum value ('1' if sum is '0', '0' if sum is '1').

Match selector and DLatch 250 selects either the possible odd memory array entry address (205) or the possible even memory array entry address (215) depending on the value of sum and sum bar. The selected memory array address (270) is then retrieved from memory array 130.

Figure 3:
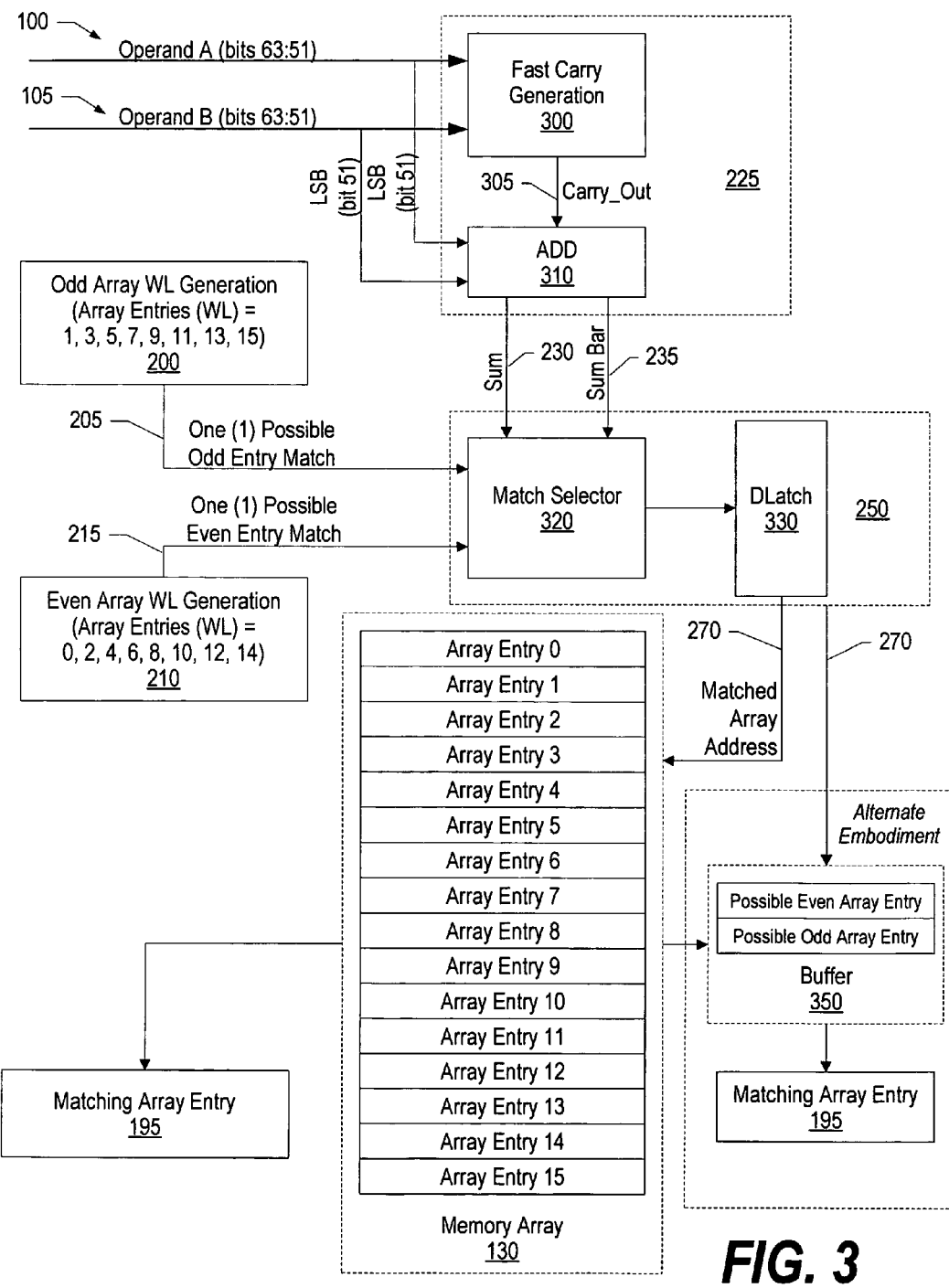
FIG. 3 is a diagram showing a match selector and a latch being used to select the word line.

FIG. 3 is a diagram showing a match selector and a latch being used to select the word line. FIG. 3 is similar to FIG. 2, however FIG. 3 shows additional detail regarding fast carry generation and sum logic 225 as well as match selector and Dlatch 250.

Fast carry generation and sum logic 225 includes fast carry generation circuitry 300 that receives less significant bits from Operands A and B (bits 51-63) and generates carry out value 305. Fast carry generation and sum logic 225 also includes addition circuitry 310 that adds the least significant address bit (LSB bit 51) from Operand A, the least significant address bit (LSB bit 51) from Operand B, and the carry out value to generate sum 230 and sum bar 235.

Match selector and Dlatch circuitry 250 includes match selector circuitry 320 which receives the possible odd and even memory array entry wordlines (205 and 215) along with sum 230 and sum bar 235 and selects one wordline. Dlatch circuitry 330 operates to latch a memory array entry wordline corresponding to the selected memory array entry address from memory array 130, resulting in matching memory array entry 195. Memory array 130 may be a TLB, a data cache or an instruction cache. Matching memory array entry 195, therefore, may be a data or instruction used by a process or processed by a processor.

In an alternate embodiment, the two possible wordline entries corresponding to odd memory array entry wordline 205 and even memory array entry wordline entry 215 are retrieved from memory array 130 and stored in a separate buffer (buffer 350) prior to the latching operation. This embodiment may be used when the possible wordline entries (205 and 215) are identified before sum 230 and sum bar 235 are provided by sum logic 225. In this embodiment, latch circuitry 330 operates to latch one of the two memory array entries that have been stored in buffer 350 resulting in matching memory array entry 195.

Figure 4:
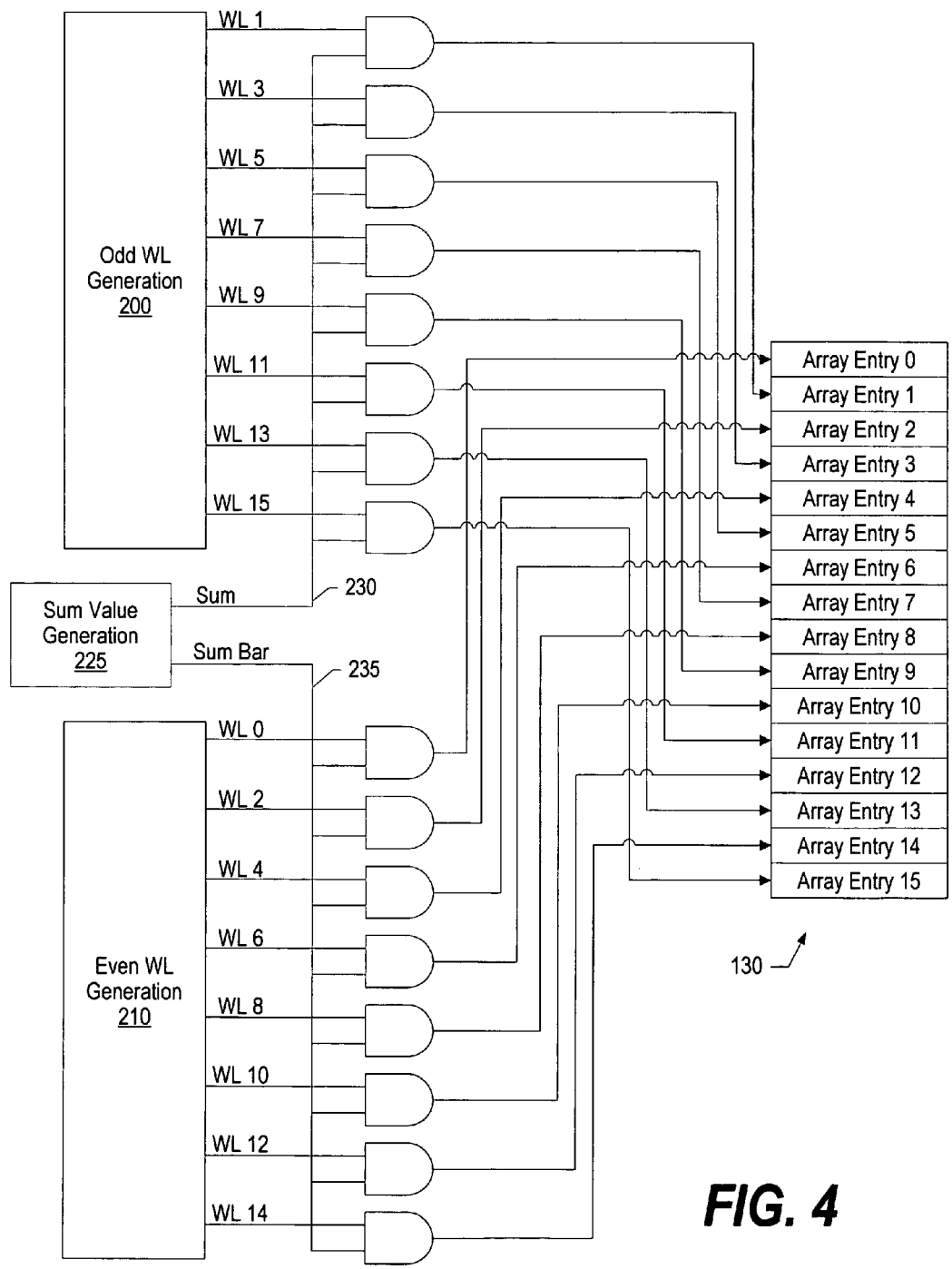
FIG. 4 is a diagram showing possible word lines being logically combined with a sum value to select two possible word lines after PGZO values have been computed.

FIG. 4 is a diagram showing possible word lines being logically combined with a sum value to select two possible word lines after PGZO values have been computed.

Wordline generators 200 generate possible wordlines for the entries in memory array 130 with odd addresses and wordline generators 210 generate possible wordlines for the entries in memory array 130 with even addresses. As result of running the PGZO values through the wordline generators, one of the odd wordlines (WL 1, 3, 5, 7, 9, 11, 13, or 15) will be enabled and one of the even wordlines will be enabled (WL 0, 2, 4, 6, 8, 10, 12, or 14). As used herein, "WL" is an abbreviation for "wordline." Sum value generation 225 creates sum value 230 and sum bar 235. As described in FIG. 2, sum bar is the opposite of sum so if sum is enabled then sum bar is not enabled, and vise versa.

Sum 230 is ANDed with each of the possible odd wordlines and sum bar 235 is ANDed with each of the possible even wordlines. In other words, both the wordline and the sum or sum bar have to be enabled in order for the signal to access one of the array entries within memory array 130. For example, assume that the possible odd wordline is WL 7 and the possible even wordline is WL 6. If sum is enabled (i.e., '1'), then sum bar would be '0' and the result of the AND operations would result in WL 7 being selected (both WL 7 and sum are enabled) and WL 6 would not be selected (WL 6 being enabled but sum bar not being enabled). On the other hand, if sum bar is enabled, then the opposite result would occur: both WL 6 and sum bar would be enabled so the result of the AND operations would propagate the WL 6 signal to memory array 130, and WL 7 would not propagate because while WL 7 is enabled, sum would not be enabled.

Figure 5:
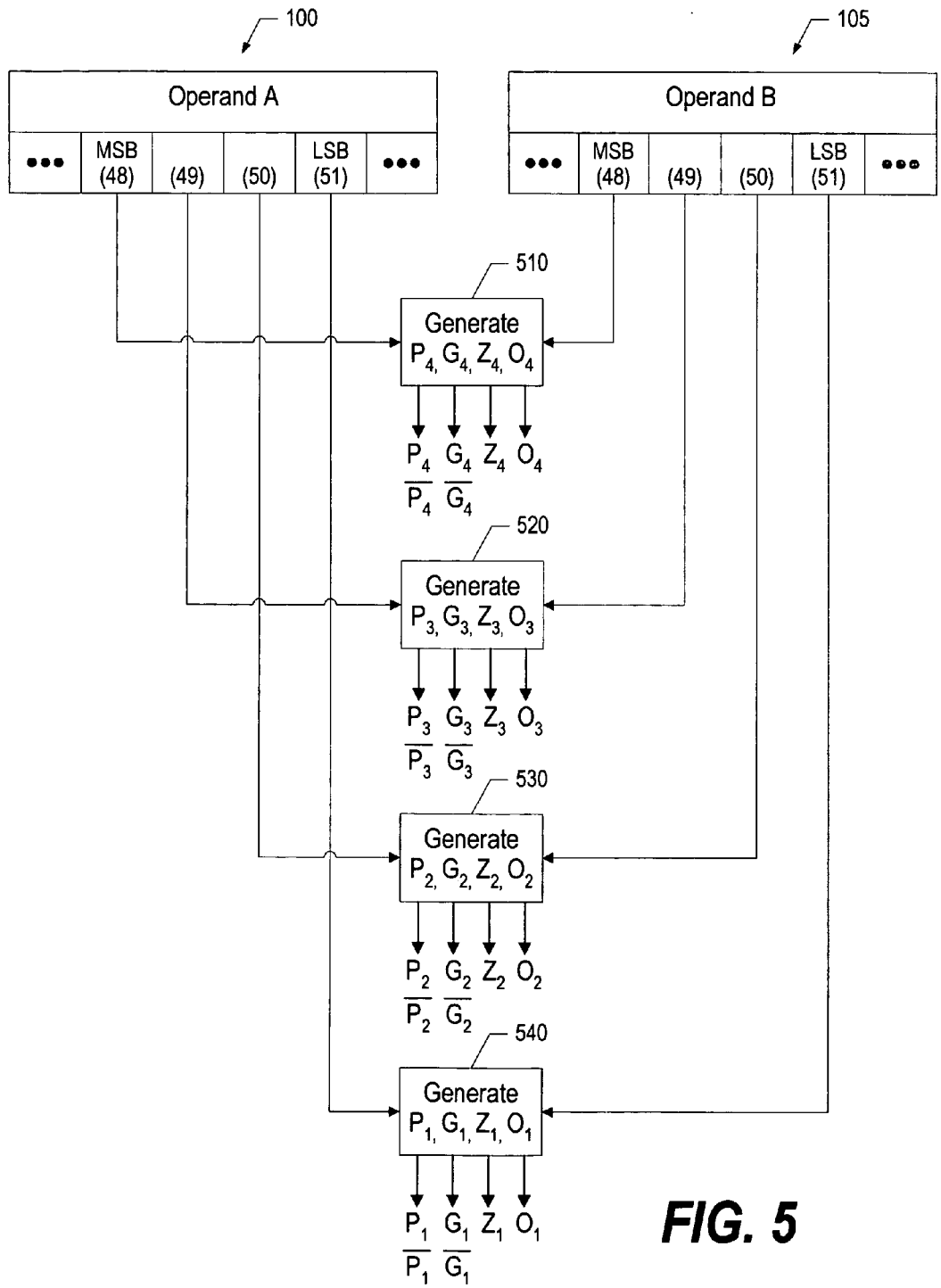
FIG. 5 is a diagram illustrating bits from the base and offset being combined to form PGZO values.

FIG. 5 is a diagram illustrating bits from the base and offset being combined to form PGZO values. PGZO generation block 510 receives the MSB from both Operands A and B (bit 48). PGZO generation block 520 receives bit 49 from both Operands A and B. PGZO generation block 530 receives bit 50 from both Operands A and B. Finally, PGZO generation block 540 receives the LSB from both Operands A and B (bit 51). The example shown addresses a sixteen-entry memory array. Additional or fewer PGZO generation blocks would be used to compute the PGZO values for more or less bits used to address larger or smaller memory arrays.

The result of each of the PGZO generations is a P value (by XORing the inputs), a G value (by ANDing the inputs), a Z value (by ANDing the inverted inputs), and an O value (by ORing the inputs). In addition, a P bar value and a G bar value are generated, with P bar being the inverse of the XOR value (by XNORing the inputs), and with G bar being the inverse of the AND value (by NANDing the inputs). As used herein, "PGZO" refers to one or more values generated by XORing bits, XNORing bits, ANDing bits, NANDing bits, ORing bits, and ANDing inverted bit values. Each logical operation may not be performed for every pair of bits. As input to the wordline generators shown in FIGS. 7 and 8, the specific mappings of PGZO values provided as inputs to the wordline generators are shown in FIGS. 10-13.

Figure 6:
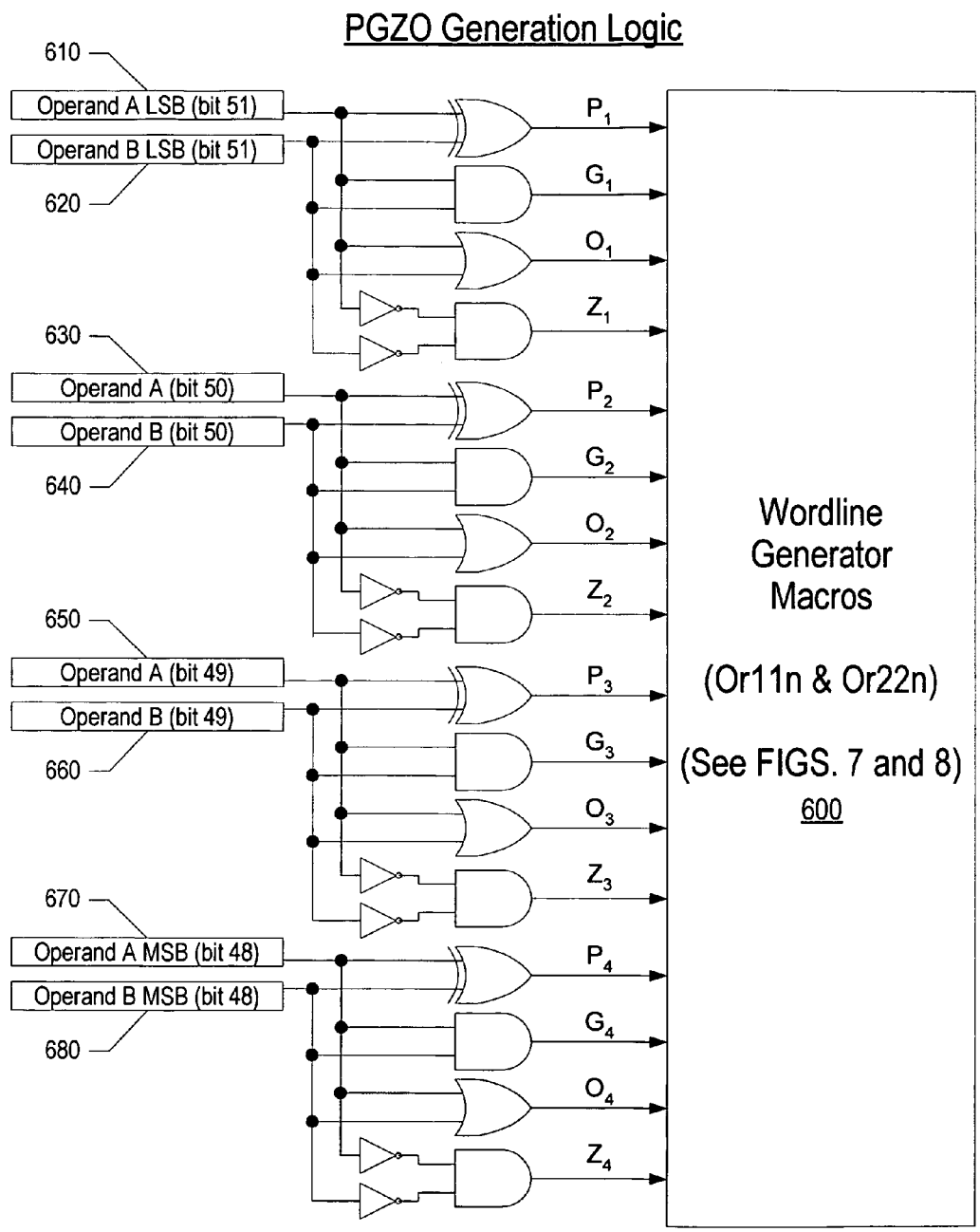
FIG. 6 is a diagram illustrating logical operations performed on various bits from the base and offset to produce PGZO values.

FIG. 6 is a diagram illustrating logical operations performed on various bits from the base and offset to produce PGZO values. The LSB from Operand A (610) is combined with the LSB from Operand B (620) by XORing, XNORing, ANDing, NANDing, ORing, and ANDing the inverted values. These values are provided as inputs to Wordline Generators 600. Likewise, PGZO values are generated using bits 50 from Operand A and B (630 and 640) and these values are provided as inputs to Wordline Generators 600. Similarly, PGZO values are generated using bits 49 from Operand A and B (650 and 660) and these values are provided as inputs to Wordline Generators 600. Finally, PGZO values are generated using the MSBs (bits 48) from Operand A and B (670 and 680) and these values are provided as inputs to Wordline Generators 600. While not shown in FIG. 6, XNOR and NAND values are also generated by inverting the XOR and AND logical values for each of the pairs of input bits. For specific mappings of the various PGZO values to wordline generators 600, see FIGS. 10-13. For the circuitry used in the wordline generators, see FIGS. 7 and 8.

Figure 7:
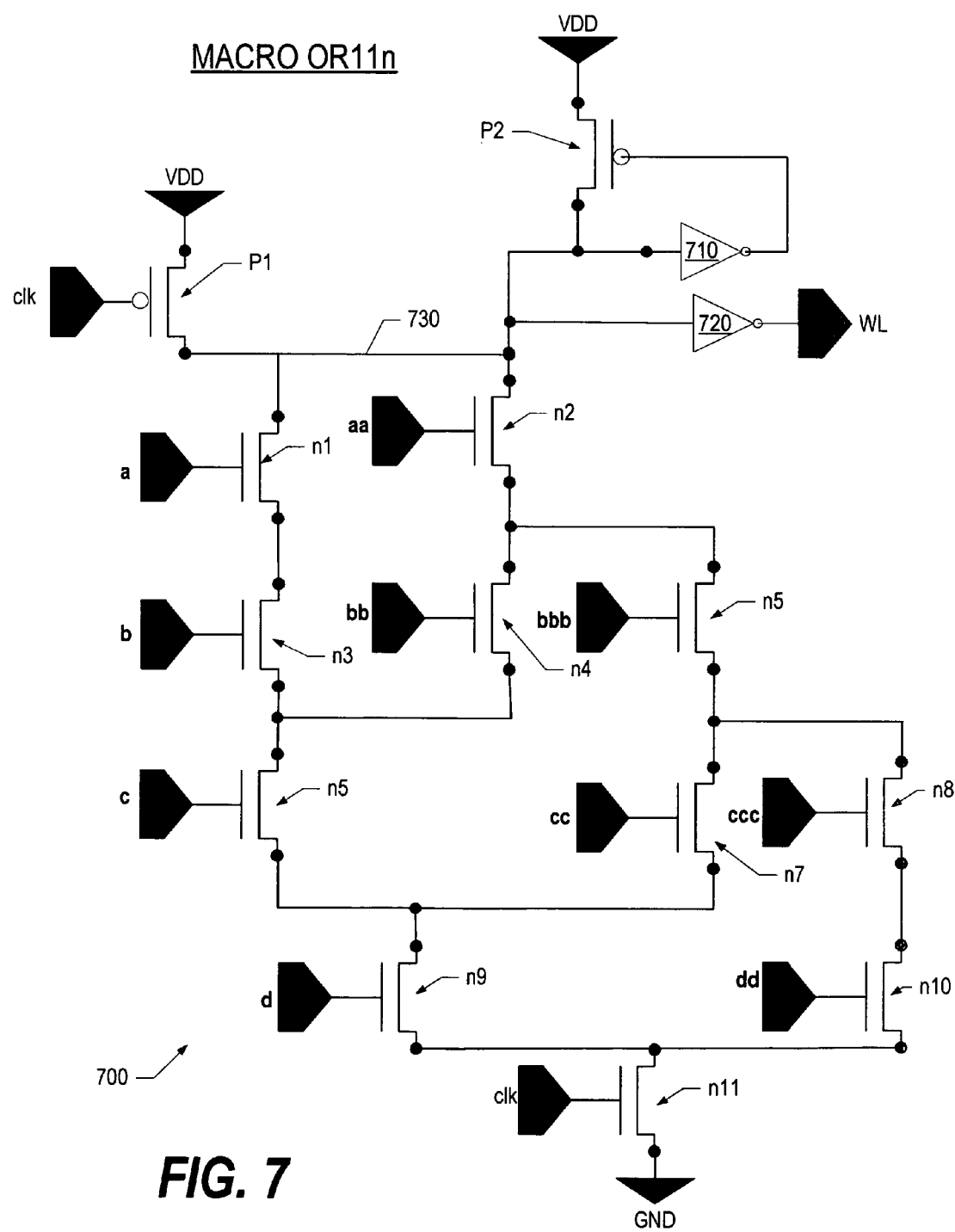
FIGS. 7 and 8 are diagrams showing two circuits used to generate the array word lines.
Figure 8:
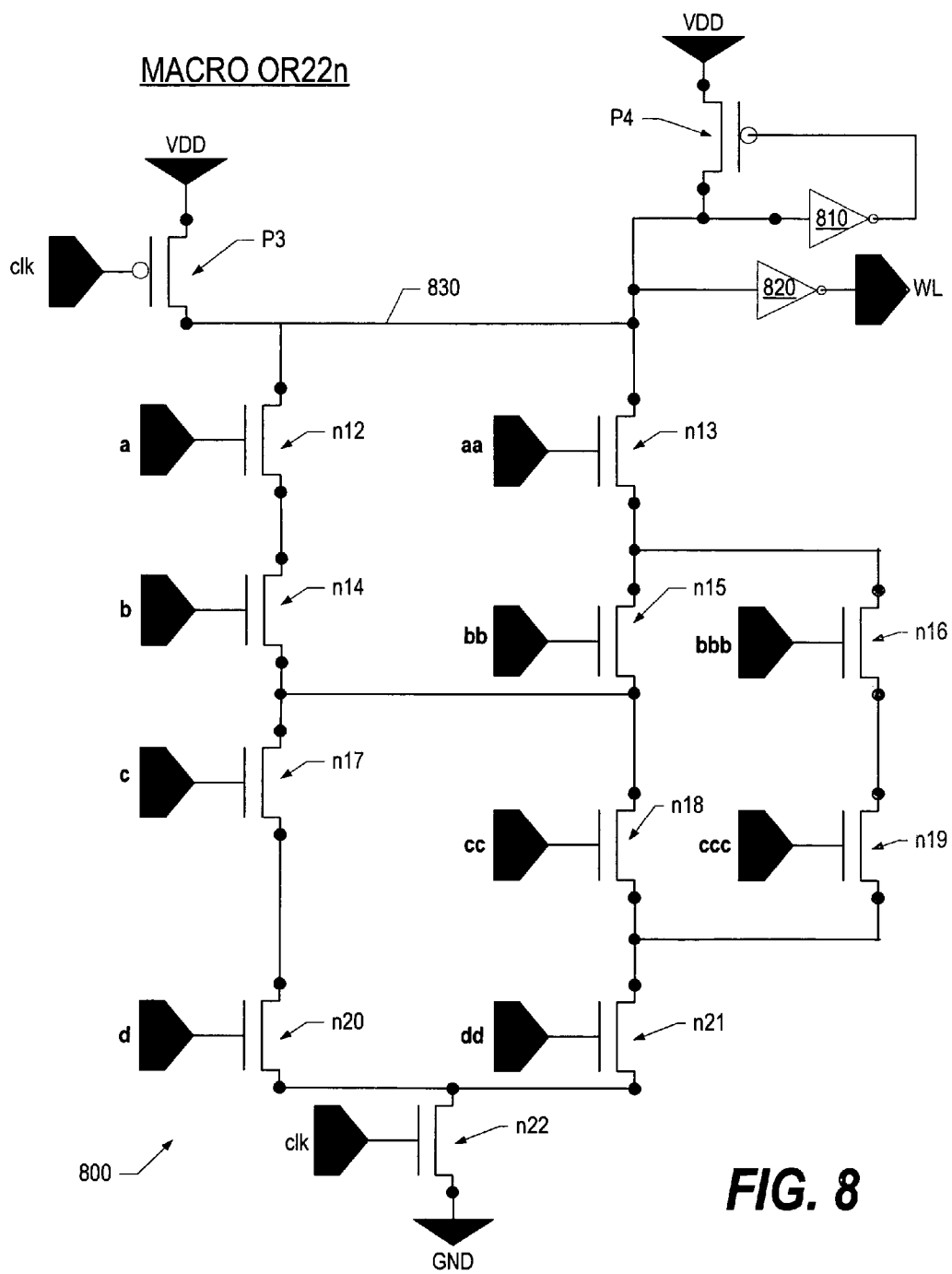

FIG. 7 and FIG. 8 show the circuits used to generate the array word lines. The circuits are referred to as "macros," "wordline generators," and "wordline generator macros." Macro Or11n is the wordline generator depicted in FIG. 7. In FIG. 7, a first clocked circuit to generate a word line is illustrated. The clocked circuit is controlled by clk clock pin. When clk is low, the circuit is in the precharge state and output WL is low. When clk is high, the circuit is in the evaluate state. The output WL now depends on the inputs a, aa, b, bb, bbb, c, cc, ccc, d and dd. The inputs at the same level of the NMOS stack are mutually exclusive. Inputs at the same level of the NMOS stack are also called an "input set." That is the first set of inputs a and aa are mutually exclusive products of the most significant bit (MSB). The second set of inputs b, bb and bbb are mutually exclusive products of the second most significant bit (MSB−1). The third set of inputs c, cc and ccc are mutually exclusive products of the second least significant bit (LSB+1). The fourth set of inputs d and dd are mutually exclusive products of the least significant bit (LSB).

The NMOS n1 and n2 are in the top level of the NMOS stacks. Either n1 or n2 would be ON depending the inputs a and aa. Similarly, the NMOS n3, n4 and n5 are at the same level below the top level of the NMOS stacks. Only one of n3, n4 and n5 would be ON depending on the inputs b, bb and bbb. The NMOS n6, n7 and n8 are in the middle level of the NMOS stack.

Only one of n6, n7 and n8 would be ON depending on the inputs c, cc and ccc.

The NMOS n9 and n10 are in the lower level of the NMOS stack. Either n9 or n10 would be ON depending on the inputs d and dd. Therefore, during the time when clk is high, there are two possibilities. Depending upon the inputs, a conductive path from the precharged node 730 to the ground GND may discharge the precharged node to 730 to LOW. The input of the inverter 720 connected to the precharged node drives a HIGH to the output WL. The input of the inverter 710 which is also connected to the precharged node 730 drives a HIGH to PMOS p2 and turning OFF the PMOS p2. Alternatively, when there is no conductive path from the precharged node 730 to ground GND, the precharged node 730 remains the precharged state. The keeper PMOS p2 actively keeps the precharged node 730 at the precharge state.

In FIG. 8, a second clocked circuit to generate a word line is illustrated. Macro Or22n is the wordline generator depicted in FIG. 8. The clocked circuit is controlled by the clock clk pin. When clk is low, the circuit is in the precharge state and output WL is low. When clk is high, the circuit is in the evaluate state. The output WL now depends on the inputs a, aa, b, bb, bbb, c, cc, ccc, d and dd. The inputs at the same level of the NMOS stack are mutually exclusive. That is the first set of inputs a and aa are mutually exclusive products of the most significant bit (MSB). The second set of inputs b, bb and bbb are mutually exclusive products of the second most significant bit (MSB−1). The third set of inputs c, cc and ccc are mutually exclusive products of the second least significant bit (LSB+1). The fourth set of inputs d and dd are mutually exclusive products of the least significant bit (LSB).

The NMOS n12 and n13 are in the top level of the NMOS stacks. Either n12 or n13 would be ON depending the inputs a and aa. Similarly, the NMOS n14, n15 and n16 are at the same level below the top level of the NMOS stacks. Only one of n14, n15 and n16 would be ON depending on the inputs b, bb and bbb. The NMOS n17, n18 and n19 are in the middle level of the NMOS stack. Only one of n17, n18 and n19 would be ON depending on the inputs c, cc and ccc. The NMOS n20 and n21 are in the lower level of the NMOS stack. Either n20 or n21 would be ON depending on the inputs d and dd. Therefore, during the time when clk is high, there are two possibilities. Depending upon the inputs, a conductive path from the precharged node 830 to the ground GND may discharge the precharged node to 830 to LOW. The input of the inverter 820 connected to the precharged node drives a HIGH to the output WL. The input of the inverter 710 which is also connected to the precharged node 830 drives a HIGH to PMOS p4 and turning OFF the PMOS p4. Alternatively, when there is no conductive path from the precharged node 830 to ground GND, the precharged node 830 remains the precharged state. The keeper PMOS p4 actively keeps the precharged node 830 at the precharge state.

Figure 9:
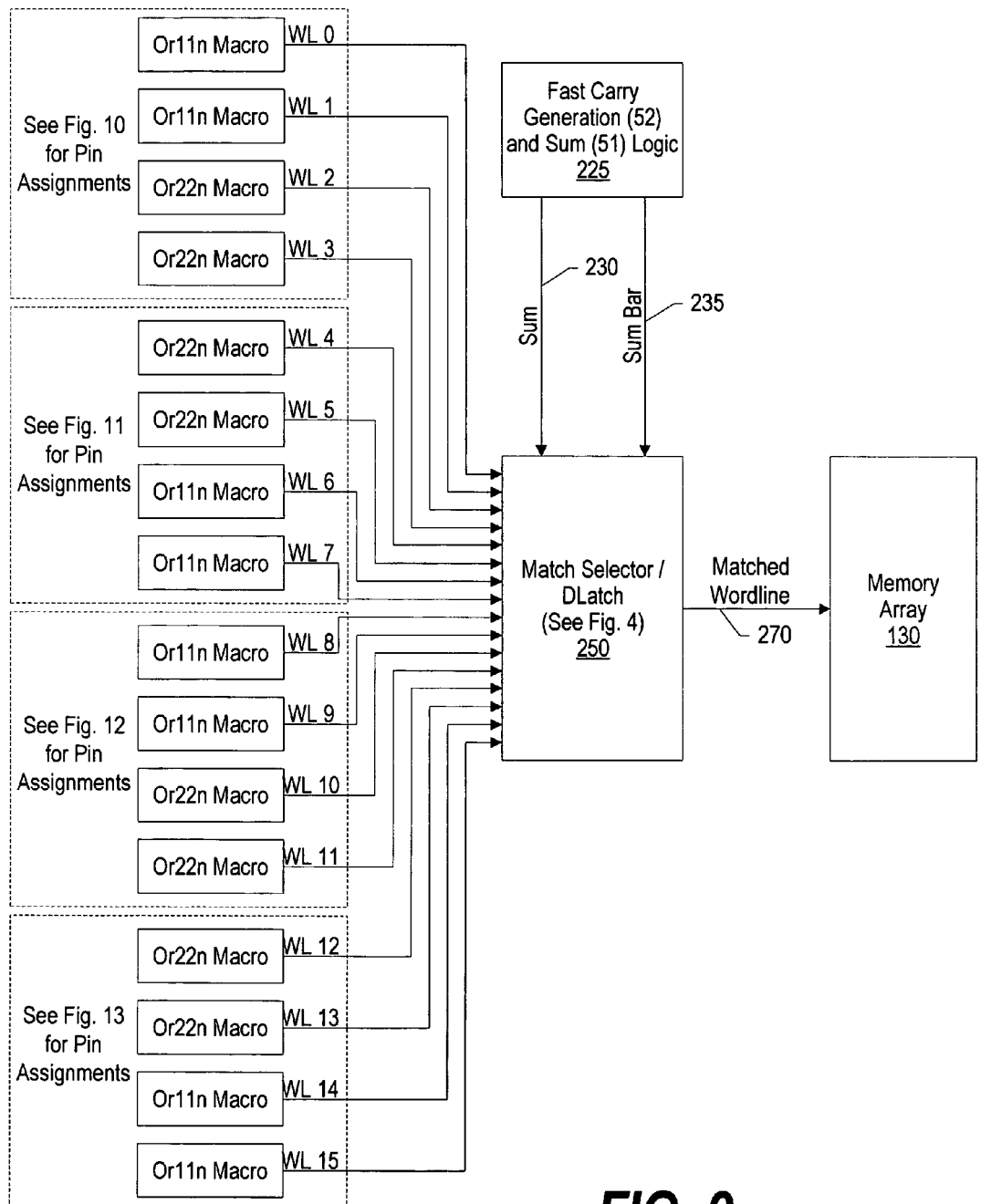
FIG. 9 is a diagram showing which of the macros is used to generate specific word lines and the match selector/latch used to compute the actual word line.

FIG. 9 is a diagram showing which of the macros is used to generate specific word lines and the match selector/latch used to compute the actual word line. The placement and groupings of the macros shown in FIG. 9 is not meant to indicate actual hardware placement or grouping of the wordline generators shown in FIGS. 7 and 8.

Two wordline generators are depicted in FIGS. 7 and 8. The wordline generator shown in FIG. 7 is referred to as the "OR11n" macro and the wordline generator shown in FIG. 8 is referred to as the "OR22n" macro. By mapping PGZO inputs to the various wordline generators, the wordline generators output whether a particular wordline is "possible" based upon the PGZO inputs. When PGZO values are generated for four address bits of two operands and run through the wordline generators as shown in FIG. 9, two possible wordlines result (an odd-addressed wordline and an even-addressed wordline).

In the embodiment shown, a sixteen entry memory array is used. Larger or smaller memory arrays could be used according to the teachings provided herein. To determine if the first memory entry is a possibility (WL 0), PGZO inputs are provided to the Or11n wordline generator (see FIG. 7 and corresponding description for a description of the Or11n wordline generator and see FIG. 10 and corresponding description for input mappings that show how the PGZO values map to the Or11n inputs). Likewise, to determine if the second memory entry is a possibility (WL 1), PGZO inputs are provided to the Or11n wordline generator (see FIG. 7 and corresponding description for a description of the Or11n wordline generator and see FIG. 10 and corresponding description for input mappings that show how the PGZO values map to the Or11n inputs).

Figure 10:
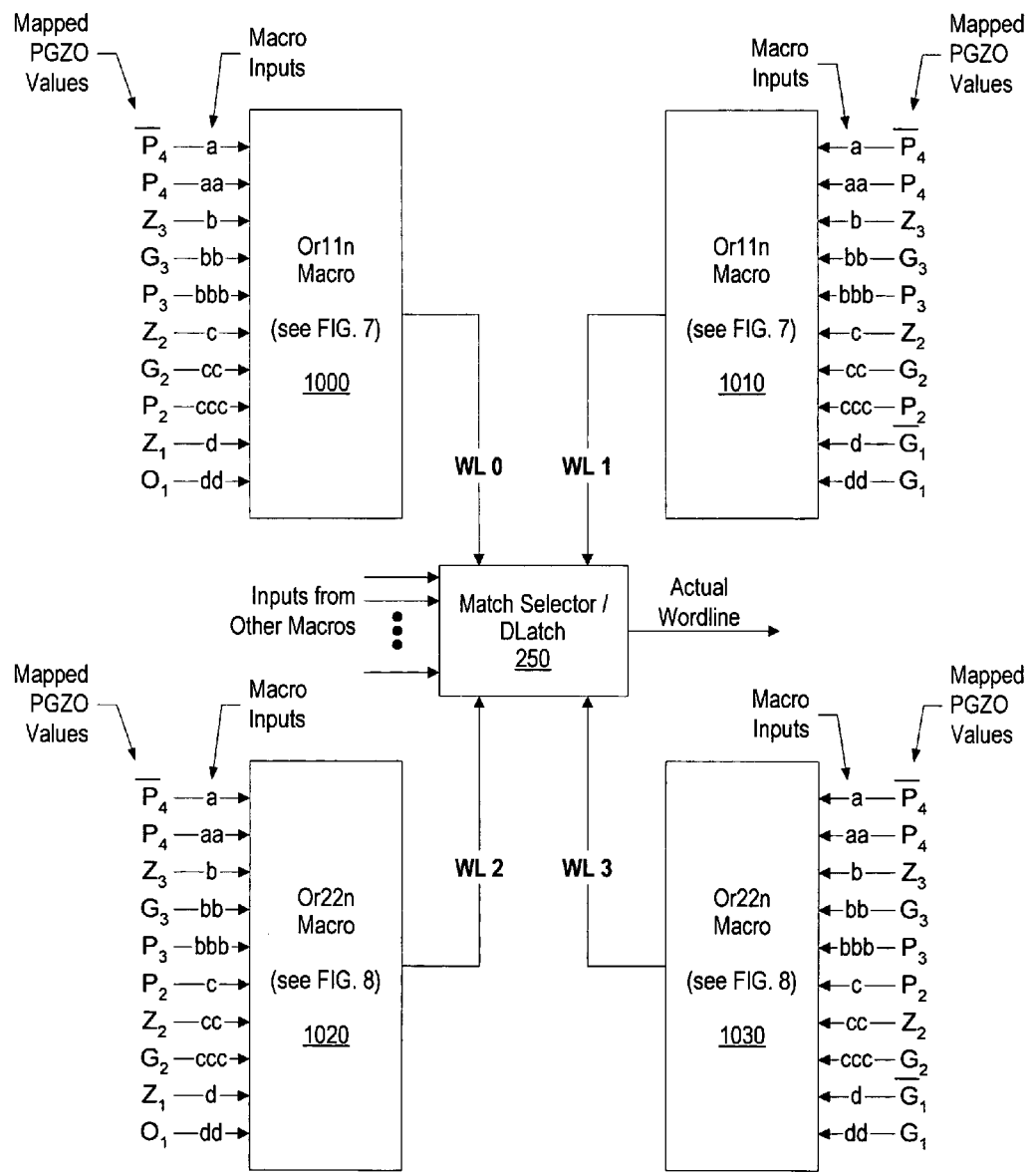
FIGS. 10-13 detail the pin assignments mapping the PGZO values to the macros to compute each of the word lines.

In order to determine if the third memory entry is a possibility (WL 2), PGZO inputs are provided to the Or22n wordline generator (see FIG. 8 and corresponding description for a description of the Or22n wordline generator and see FIG. 10 and corresponding description for input mappings that show how the PGZO values map to the Or22n inputs).

Likewise, to determine if the fourth memory entry is a possibility (WL 3), PGZO inputs are provided to the Or22n wordline generator (see FIG. 8 and corresponding description for a description of the Or22n wordline generator and see FIG. 10 and corresponding description for input mappings that show how the PGZO values map to the Or22n inputs).

Figure 11:
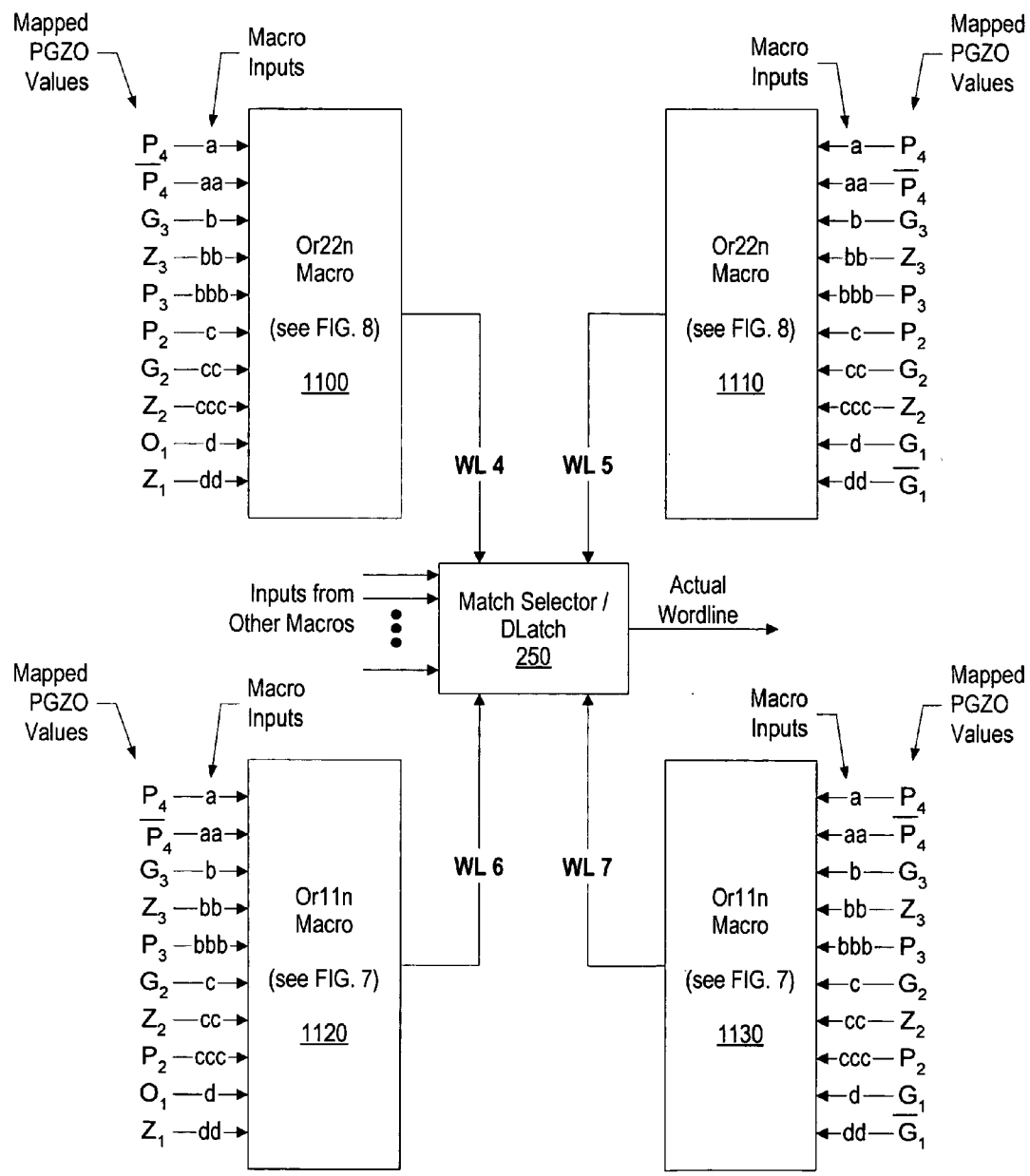

In order to determine if the fifth memory entry is a possibility (WL 4), PGZO inputs are provided to the Or22n wordline generator (see FIG. 8 and corresponding description for a description of the Or22n wordline generator and see FIG. 11 and corresponding description for input mappings that show how the PGZO values map to the Or22n inputs).

Likewise, to determine if the sixth memory entry is a possibility (WL 5), PGZO inputs are provided to the Or22n wordline generator (see FIG. 8 and corresponding description for a description of the Or22n wordline generator and see FIG. 11 and corresponding description for input mappings that show how the PGZO values map to the Or22n inputs).

To determine if the seventh memory entry is a possibility (WL 6), PGZO inputs are provided to the Or11n wordline generator (see FIG. 7 and corresponding description for a description of the Or11n wordline generator and see FIG. 11 and corresponding description for input mappings that show how the PGZO values map to the Or11n inputs). Likewise, to determine if the eighth memory entry is a possibility (WL 7), PGZO inputs are provided to the Or11n wordline generator (see FIG. 7 and corresponding description for a description of the Or11n wordline generator and see FIG. 11 and corresponding description for input mappings that show how the PGZO values map to the Or11n inputs).

Figure 12:
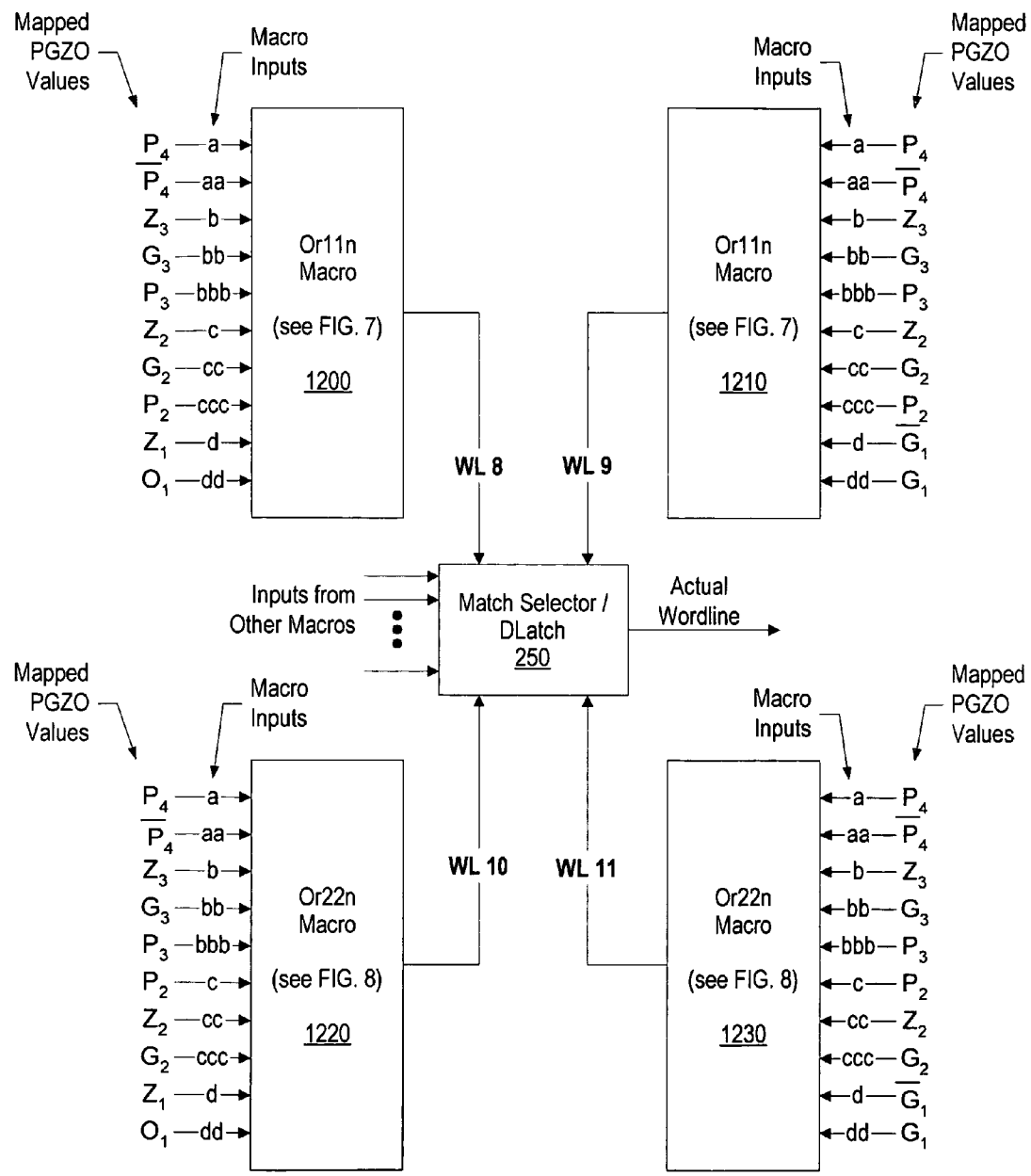

To determine if the ninth memory entry is a possibility (WL 8), PGZO inputs are provided to the Or11n wordline generator (see FIG. 7 and corresponding description for a description of the Or11n wordline generator and see FIG. 12 and corresponding description for input mappings that show how the PGZO values map to the Or11n inputs). Likewise, to determine if the tenth memory entry is a possibility (WL 9), PGZO inputs are provided to the Or11n wordline generator (see FIG. 7 and corresponding description of the Or11n wordline generator and see FIG. 12 and corresponding description for input mappings that show how the PGZO values map to the Or11n inputs).

In order to determine if the eleventh memory entry is a possibility (WL 10), PGZO inputs are provided to the Or22n wordline generator (see FIG. 8 and corresponding description for a description of the Or22n wordline generator and see FIG. 12 and corresponding description for input mappings that show how the PGZO values map to the Or22n inputs). Likewise, to determine if the twelfth memory entry is a possibility (WL 11), PGZO inputs are provided to the Or22n wordline generator (see FIG. 8 and corresponding description for a description of the Or22n wordline generator and see FIG. 12 and corresponding description for input mappings that show how the PGZO values map to the Or22n inputs).

Figure 13:
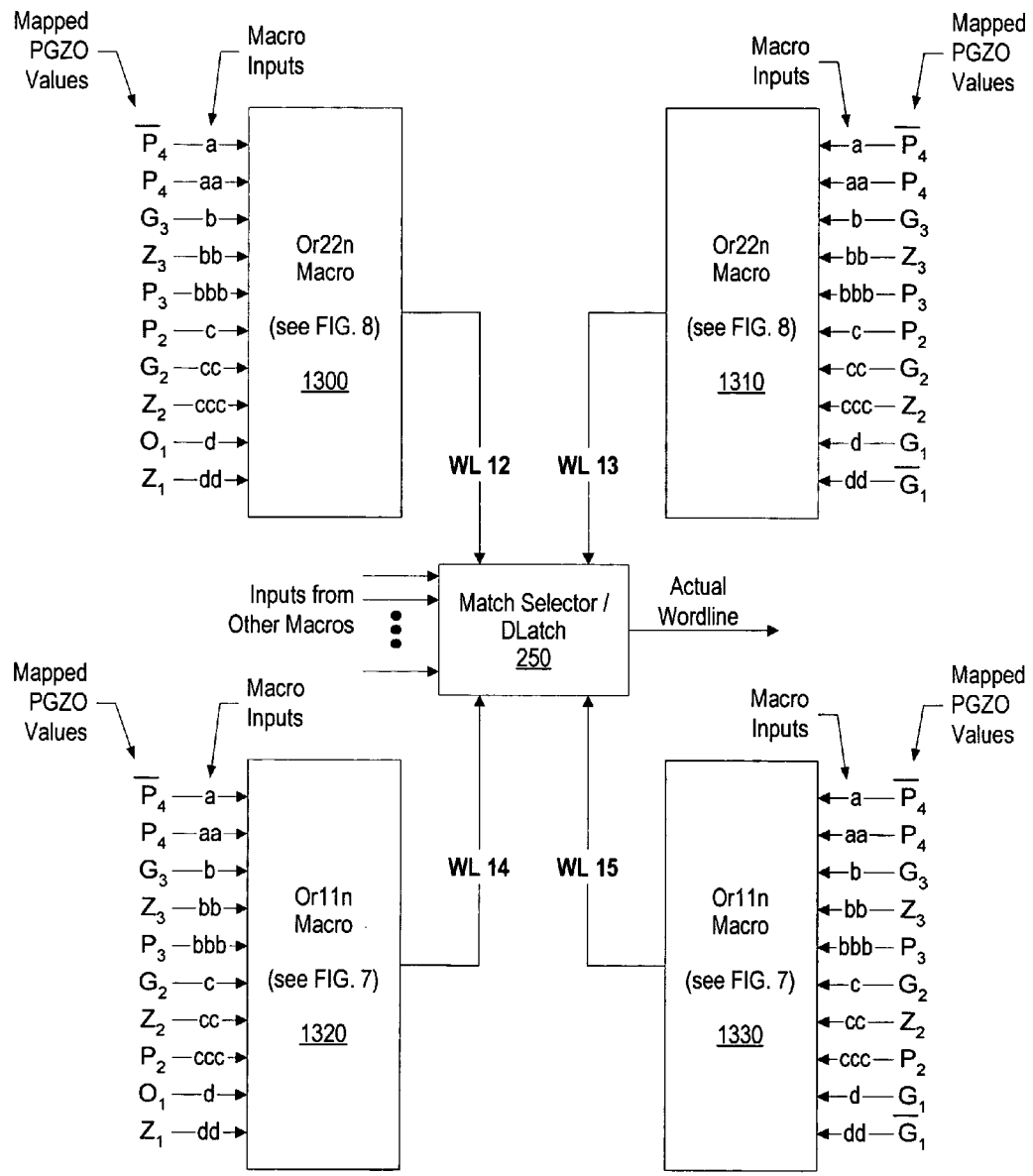

In order to determine if the thirteenth memory entry is a possibility (WL 12), PGZO inputs are provided to the Or22n wordline generator (see FIG. 8 and corresponding description for a description of the Or22n wordline generator and see FIG. 13 and corresponding description for input mappings that show how the PGZO values map to the Or22n inputs). Likewise, to determine if the fourteenth memory entry is a possibility (WL 13), PGZO inputs are provided to the Or22n wordline generator (see FIG. 8 and corresponding description for a description of the Or22n wordline generator and see FIG. 13 and corresponding description for input mappings that show how the PGZO values map to the Or22n inputs).

Finally, to determine if the fifteenth memory entry is a possibility (WL 14), PGZO inputs are provided to the Or11n wordline generator (see FIG. 7 and corresponding description for a description of the Or11n wordline generator and see FIG. 13 and corresponding description for input mappings that show how the PGZO values map to the Or11n inputs). Likewise, to determine if the sixteenth memory entry is a possibility (WL 15), PGZO inputs are provided to the Or11n wordline generator (see FIG. 7 and corresponding description for a description of the Or11n wordline generator and see FIG. 13 and corresponding description for input mappings that show how the PGZO values map to the Or11n inputs).

As a result of the PGZO values being mapped and supplied to the wordline generators as described above, two possible wordlines will be ON and will provide input to match selector/Dlatch circuitry 250. In addition, circuitry 250 receives sum and sum bar from fast carry generation and sum logic 225. In one embodiment, shown in FIG. 4, the sum value is ANDed with the odd possible wordlines (WLs 1, 3, 5, 7, 9, 11, 13, and 15) and the sum bar value is ANDed with the even possible wordlines (WLs 0, 2, 4, 6, 8, 10, 12, and 14).

Because only one of the sum or sum bar will be ON, only one of the two wordlines will propagate as matched wordline 270 which will be used to access the corresponding entry in memory array 130.

FIGS. 10-13 detail the pin assignments mapping the PGZO values to the wordline generators to compute each of the word lines. The wordline generators (Or11n and Or22n) shown in FIGS. 7 and 8 have a variety of inputs labeled a, aa, b, bb, bbb, c, cc, ccc, d, and dd. Depending upon the possible wordline being generated by the wordline generator, different PGZO values are mapped to the wordline inputs. In order to compute possible wordlines for a sixteen entry memory array, sixteen wordline generators are used—eight wordline generators Or11n (depicted in FIG. 7) and eight wordline generators Or22n (depicted in FIG. 8).

The subscript next to each P, G, Z, or O value indicates which bit pairing is used to generate the respective value, with '1' being the LSB and '4' being the MSB. In addition, a line over a P, G, Z, or O indicates that the inverse of the logic function is provided as input. For example, a $P_4$ indicates that the input is a result of an XOR of the MSBs (i.e., bit 48 from Operands A and B). Likewise, a $G_3$ indicates that the input is a result of an AND of bit 49 from Operands A and B. A $Z_2$ indicates that the input is a result of an AND of the inverted bit values of bit 50 from Operands A and B. An $O_1$ indicates that the input is a result of an OR of the LSBs (bit 51 from Operands A and B).

FIG. 10 details the mappings of the PGZO values to the input pins of wordline generators Or11n and Or22n to determine whether WL 0, 1, 2, or 3 are possibilities. FIG. 11 details the mappings of the PGZO values to the input pins of wordline generators Or11n and Or22n to determine whether WL 4, 5, 6, or 7 are possibilities. Similarly, FIG. 12 details the mappings of the PGZO values to the input pins of wordline generators Or11n and Or22n to determine whether WL 8, 9, 10, or 11 are possibilities. Finally, FIG. 13 details the mappings of the PGZO values to the input pins of wordline generators Or11n and Or22n to determine whether WL 12, 13, 14, or 15 are possibilities.

The tables below detail the inputs shown in FIGS. 10-13. The term "MSB−1" is used to denote the next bit after the MSB (i.e., bit 49) and "LSB+1" is used to denote the bit before the LSB (i.e., bit 50).

To determine whether WL 0 is a possibility, a copy of the Or11n wordline generator is used (see FIG. 7). Copy 1000 of wordline generator Or11n shown in FIG. 10 uses the following mapping of PGZO values:

| Macro Input (see FIG. 7) | PGZO Value Mapped to Input |
| --- | --- |
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | AND of inverted LSB + 1 |
| cc | AND of MSB − 1 |
| ccc | XOR of LSB + 1 |
| d | AND of inverted LSB |
| dd | OR of LSB |

To determine whether WL 1 is a possibility, a copy of the Or11n wordline generator is used (see FIG. 7). Copy 1010 of wordline generator Or11n shown in FIG. 10 uses the following mapping of PGZO values:

| Macro Input (see FIG. 7) | PGZO Value Mapped to Input |
| --- | --- |
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | AND of inverted LSB + 1 |
| cc | AND Of MSB − 1 |
| ccc | XOR of LSB + 1 |
| d | Inverted AND (NAND) of LSB |
| dd | AND of LSB |

To determine whether WL 2 is a possibility, a copy of the Or22n wordline generator is used (see FIG. 8). Copy 1020 of wordline generator Or22n shown in FIG. 10 uses the following mapping of PGZO values:

| Macro Input (see FIG. 8) | PGZO Value Mapped to Input |
| --- | --- |
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | AND of inverted LSB |
| dd | OR of LSB |

To determine whether WL 3 is a possibility, a copy of the Or22n wordline generator is used (see FIG. 8).

Copy 1030 of wordline generator Or22n shown in FIG. 10 uses the following mapping of PGZO values:

| Macro Input (see FIG. 8) | PGZO Value Mapped to Input |
| --- | --- |
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | Inverted AND (NAND) of LSB |
| dd | AND of LSB |

Turning to FIG. 11, in order to determine whether WL 4 is a possibility, a copy of the Or22n wordline generator is used (see FIG. 8). Copy 1100 of wordline generator Or22n shown in FIG. 11 uses the following mapping of PGZO values:

| Macro Input (see FIG. 8) | PGZO Value Mapped to Input |
| --- | --- |
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | OR of LSB |
| dd | AND of inverted LSB |

To determine whether WL 5 is a possibility, a copy of the Or22n wordline generator is used (see FIG. 8).

Copy 1110 of wordline generator Or22n shown in FIG. 11 uses the following mapping of PGZO values:

| Macro Input (see FIG. 8) | PGZO Value Mapped to Input |
| --- | --- |
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | AND of LSB |
| dd | Inverted AND (NAND) of LSB |

To determine whether WL 6 is a possibility, a copy of the Or11n wordline generator is used (see FIG. 7). Copy 1120 of wordline generator Or11n shown in FIG. 11 uses the following mapping of PGZO values:

| Macro Input (see FIG. 7) | PGZO Value Mapped to Input |
| --- | --- |
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | AND of LSB + 1 |

-continued

| Macro Input (see FIG. 7) | PGZO Value Mapped to Input |
|---|---|
| cc | AND of inverted LSB + 1 |
| ccc | XOR of LSB + 1 |
| d | OR of LSB |
| dd | AND of inverted LSB |

To determine whether WL 7 is a possibility, a copy of the Or11n wordline generator is used (see FIG. 7). Copy 1130 of wordline generator Or11n shown in FIG. 11 uses the following mapping of PGZO values:

| Macro Input (see FIG. 7) | PGZO Value Mapped to Input |
|---|---|
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | AND of LSB |
| dd | Inverted AND (NAND) of LSB |

Turning to FIG. 12, in order to determine whether WL 8 is a possibility, a copy of the Or11n wordline generator is used (see FIG. 7). Copy 1200 of wordline generator Or11n shown in FIG. 12 uses the following mapping of PGZO values:

| Macro Input (see FIG. 7) | PGZO Value Mapped to Input |
|---|---|
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | AND of inverted LSB + 1 |
| cc | AND of LSB + 1 |
| ccc | XOR of LSB + 1 |
| d | AND of inverted LSB |
| dd | OR of LSB |

To determine whether WL 9 is a possibility, a copy of the Or11n wordline generator is used (see FIG. 7).

Copy 1210 of wordline generator Or11n shown in FIG. 12 uses the following mapping of PGZO values:

| Macro Input (see FIG. 7) | PGZO Value Mapped to Input |
|---|---|
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | AND of inverted LSB + 1 |
| cc | AND of LSB + 1 |
| ccc | XOR of LSB + 1 |
| d | Inverted AND (NAND) of LSB |
| dd | AND of LSB |

To determine whether WL 10 is a possibility, a copy of the Or22n wordline generator is used (see FIG. 8).

Copy 1220 of wordline generator Or22n shown in FIG. 12 uses the following mapping of PGZO values:

| Macro Input (see FIG. 8) | PGZO Value Mapped to Input |
|---|---|
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | AND of inverted LSB |
| dd | OR of LSB |

To determine whether WL 11 is a possibility, a copy of the Or22n wordline generator is used (see FIG. 8).

Copy 1230 of wordline generator Or22n shown in FIG. 12 uses the following mapping of PGZO values:

| Macro Input (see FIG. 8) | PGZO Value Mapped to Input |
|---|---|
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | Inverted AND of LSB |
| dd | AND of LSB |

Turning to FIG. 13, in order to determine whether WL 12 is a possibility, a copy of the Or22n wordline generator is used (see FIG. 8). Copy 1300 of wordline generator Or22n shown in FIG. 13 uses the following mapping of PGZO values:

| Macro Input (see FIG. 8) | PGZO Value Mapped to Input |
|---|---|
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | OR of LSB |
| dd | AND of inverted LSB |

To determine whether WL 13 is a possibility, a copy of the Or22n wordline generator is used (see FIG. 8).

Copy 1310 of wordline generator Or22n shown in FIG. 13 uses the following mapping of PGZO values:

| Macro Input (see FIG. 8) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | AND of LSB |
| dd | Inverted AND (NAND) of LSB |

To determine whether WL 14 is a possibility, a copy of the Or11n wordline generator is used (see FIG. 7). Copy 1320 of wordline generator Or11n shown in FIG. 13 uses the following mapping of PGZO values:

| Macro Input (see FIG. 7) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | OR of LSB |
| dd | AND of inverted LSB |

Finally, in order to determine whether WL 15 is a possibility, a copy of the Or11n wordline generator is used (see FIG. 7). Copy 1330 of wordline generator Or11n shown in FIG. 13 uses the following mapping of PGZO values:

| Macro Input (see FIG. 7) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | AND of LSB |
| dd | Inverted AND (NAND) of LSB |

Figure 14:
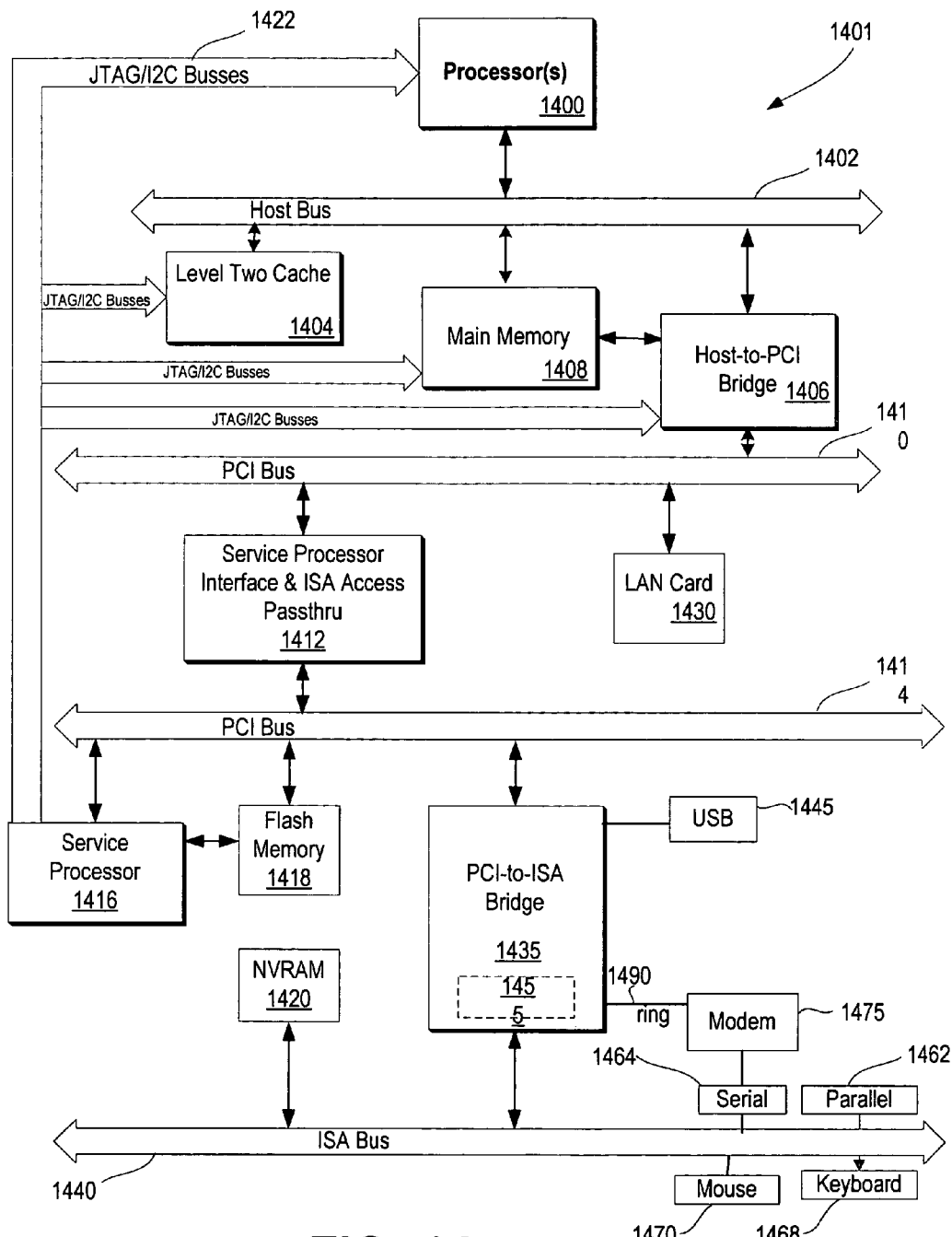
FIG. 14 is a block diagram of a data processing system in which a preferred embodiment of the present invention may be implemented.

FIG. 14 illustrates information handling system 1401 which is a simplified example of a computer system capable of performing the computing operations of the host computer described herein with respect to a preferred embodiment of the present invention. Computer system 1401 includes processor 1400 which is coupled to host bus 1402. A level two (L2) cache memory 1404 is also coupled to host bus 1402. Host-to-PCI bridge 1406 is coupled to main memory 1408, includes cache memory and main memory control functions, and provides bus control to handle transfers among PCI bus 1410, processor 1400, L2 cache 1404, main memory 1408, and host bus 1402. Main memory 1408 is coupled to Host-to-PCI bridge 1406 as well as host bus 1402. Devices used solely by host processor(s) 1400, such as LAN card 1430, are coupled to PCI bus 1410. Service Processor Interface and ISA Access Pass-through 1412 provide an interface between PCI bus 1410 and PCI bus 1414. In this manner, PCI bus 1414 is insulated from PCI bus 1410. Devices, such as flash memory 1418, are coupled to PCI bus 1414. In one implementation, flash memory 1418 includes BIOS code that incorporates the necessary processor executable code for a variety of low-level system functions and system boot functions.

PCI bus 1414 provides an interface for a variety of devices that are shared by host processor(s) 1400 and Service Processor 1416 including, for example, flash memory 1418. PCI-to-ISA bridge 1435 provides bus control to handle transfers between PCI bus 1414 and ISA bus 1440, universal serial bus (USB) functionality 1445, power management functionality 1455, and can include other functional elements not shown, such as a real-time clock (RTC), DMA control, interrupt support, and system management bus support. Nonvolatile RAM 1420 is attached to ISA Bus 1440. Service Processor 1416 includes JTAG and I2C buses 1422 for communication with processor(s) 1400 during initialization steps. JTAG/I2C buses 1422 are also coupled to L2 cache 1404, Host-to-PCI bridge 1406, and main memory 1408 providing a communications path between the processor, the Service Processor, the L2 cache, the Host-to-PCI bridge, and the main memory. Service Processor 1416 also has access to system power resources for powering down information handling device 1401.

Peripheral devices and input/output (I/O) devices can be attached to various interfaces (e.g., parallel interface 1462, serial interface 1464, keyboard interface 1468, and mouse interface 1470 coupled to ISA bus 1440. Alternatively, many I/O devices can be accommodated by a super I/O controller (not shown) attached to ISA bus 1440.

In order to attach computer system 1401 to another computer system to copy files over a network, LAN card 1430 is coupled to PCI bus 1410. Similarly, to connect computer system 1401 to an ISP to connect to the Internet using a telephone line connection, modem 1475 is connected to serial port 1464 and PCI-to-ISA Bridge 1435.

While the computer system described in FIG. 14 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method comprising:
receiving a first plurality of base address bits and a first plurality of offset address bits;
pairing each of the first plurality of base address bits with a corresponding bit from the first plurality of offset address bits;
generating a plurality of PGZO values for each of the paired bits wherein a P value results from a logical XOR operation performed on each of the paired bits, a G value results from a logical AND operation performed on each of the paired bits, a Z value results from a logical OR operation performed on each of the paired bits, and an O value results from a logical AND operation performed on the inverse value of each of the paired bits;
mapping the resulting P, G, Z, and O values (the PGZO values) to a plurality of wordline functions;
evaluating the PGZO values using the plurality of wordline functions, the evaluating resulting in two possible memory array entry matches; and
selecting one of the two possible memory array entry matches from a memory array based on whether a carry value results from adding at least the least significant bit of the base address bits with the least significant bit of the offset address bits.

2. The method of claim 1 wherein the adding takes place in parallel with the generation of the plurality of POZO values.

3. The method of claim 1 wherein the number of wordline generators is equal to the number of entries in the memory array,
wherein the mapping of the PGZO values to the wordline generators is based upon the bitwise significance of the corresponding base and offset address bits.

4. The method of claim 3 wherein the mapped PGZO values include a plurality of input sets, wherein a first input set includes mutually exclusive products of the most significant bit (MSB) for the base and offset address bits and wherein a second input set includes mutually exclusive products of the least significant bit (LSB) for the base and offset address bits.

5. The method of claim 4 wherein each of the input sets is processed by a different NMOS stack from a plurality of NMOS stacks included in a circuit that executes the wordline generator.

6. A data processing system comprising:
one or more processors;
a memory array that includes a plurality of memory array entries, the memory array accessible by the processors;
selection circuitry that addresses a memory array entry from the memory array, the selection circuitry including:
an input of a first plurality of base address bits and a first plurality of offset address bits, wherein each of the first plurality of base address bits are paired with the first plurality of offset address bits;
a PGZO generator that generates PGZO values based upon the paired bits wherein a P value results from a logical XOR operation performed on each of the paired bits, a G value results from a logical AND operation performed on each of the paired bits, a Z value results from a logical OR operation performed on each of the paired bits, and an O value results from a logical AND operation performed on the inverse value of each of the paired bits;
a plurality of wordline generator circuits that evaluate the resulting P, G, Z, and O values (the PGZO values) generated PGZO values and result with two possible memory array entry addresses;
a fast carry generation circuitry that executes while the PGZO generator generates the PGZO values, the fast carry generation circuitry resulting in a carry out value;
a match selector that selects one of the possible memory array entry addresses based upon the carry out value provided by the fast carry generation circuitry; and
a latch that latches the memory array entry corresponding to the selected memory array entry address.

7. The data processing system of claim 6 wherein the selection circuitry further comprises:
the fast carry generation circuitry generates the carry out value from a second plurality of base address bits combined with a second plurality of offset address bits; and
addition circuitry to add a least significant bit from the first plurality of base address bits and from the first plurality of offset address bits to the carry out value, wherein the match selector uses the result of the addition circuitry to make the selection.

8. The data processing system of claim 7, wherein there are two possible memory array entry addresses, the system further comprising:
retrieval circuitry that retrieves the two possible memory array entries prior to the operation of the match selector, wherein the latch latches one of the retrieved memory array entries that corresponds to the selected memory array entry address.

9. The data processing system of claim 6 further comprising:
the two possible memory array addresses include one possible even memory array address and one possible odd memory array address as result of the executing; and
addition circuitry to add a least significant bit from the first plurality of base address bits and from the first plurality of offset address bits to the carry out value, wherein the match selector uses the result of the addition circuitry to select one of either the possible even memory array address or the possible odd memory array address based upon a result of the addition circuitry.

10. The data processing system of claim 9 wherein the number of wordline generator circuits is equal to the number of entries in the memory array.

11. The data processing system of claim 10 wherein the mapped POZO values include a plurality of input sets, wherein a first input set includes mutually exclusive products of the most significant bit (MSB) for the base and offset address bits and wherein a second input set includes mutually exclusive products of the least significant bit (LSB) for the base and offset address bits.

12. The data processing system of claim 11 wherein each of the input sets is processed by a different NMOS stack from a plurality of NMOS stacks included in the wordline generator circuitry.

13. A computer-implemented method comprising:
receiving a base and offset operand, wherein each operand includes a first plurality of address bits;
pairing each base address bit with a corresponding offset address bit;
generating one or more PGZO values for each pair of bits wherein a P value results from a logical XOR operation performed on each of the paired bits, a G value results from a logical AND operation performed on each of the paired bits, a Z value results from a logical OR operation performed on each of the paired bits, and an O value results from a logical AND operation performed on the inverse value of each of the paired bits;
running the PGZO values for each pair of bits through a plurality of wordline generators, the running resulting in two possible memory array entry addresses;
performing fast carry generation on a second plurality of address bits, the fast carry generation resulting in a carry out value;
summing the carry out value with least significant bits (LSBs) selected from the first plurality of address bits, the summing resulting in a sum value;
selecting one of the two possible memory entry addresses based upon the sum value; and
latching a memory array entry within a memory array, wherein the memory array entry corresponds to the selected memory entry address.

14. The method of claim 13 further comprising:
receiving the two possible memory array addresses that include one possible even memory array address and one possible odd memory array address as result of the running of the wordline generators; and
selecting one of either the possible even memory array address or the possible odd memory array address based upon the sum value.

15. The method of claim 13 wherein the number of wordline generators is equal to the number of entries in the memory array.

16. The method of claim 13 wherein there are sixteen memory array entries in the memory array, eight copies of a first wordline generator, and eight copies of a second wordline generator, and wherein the wordline generators include:
a first group of eight wordline generators that are selected from the copies of the first and the second wordline generators and collectively generate one possible odd memory array entry address; and
a second group of eight wordline generators that are selected from the copies of the first and the second wordline generators and collectively generate one possible even memory array entry address.

* * * * *